W. M. SMITH.
Fishing-Rods.

No. 140,656.

Patented July 8, 1873.

Witnesses:

Inventor:
W. M. Smith
Per
Attorneys.

UNITED STATES PATENT OFFICE.

WILLIAM M. SMITH, OF READING, PENNSYLVANIA, ASSIGNOR OF ONE-THIRD HIS RIGHT TO HENRY Z. ERMENTROUT, OF SAME PLACE.

IMPROVEMENT IN FISHING-RODS.

Specification forming part of Letters Patent No. 140,656, dated July 8, 1873; application filed May 17, 1873.

*To all whom it may concern:*

Figure 1:
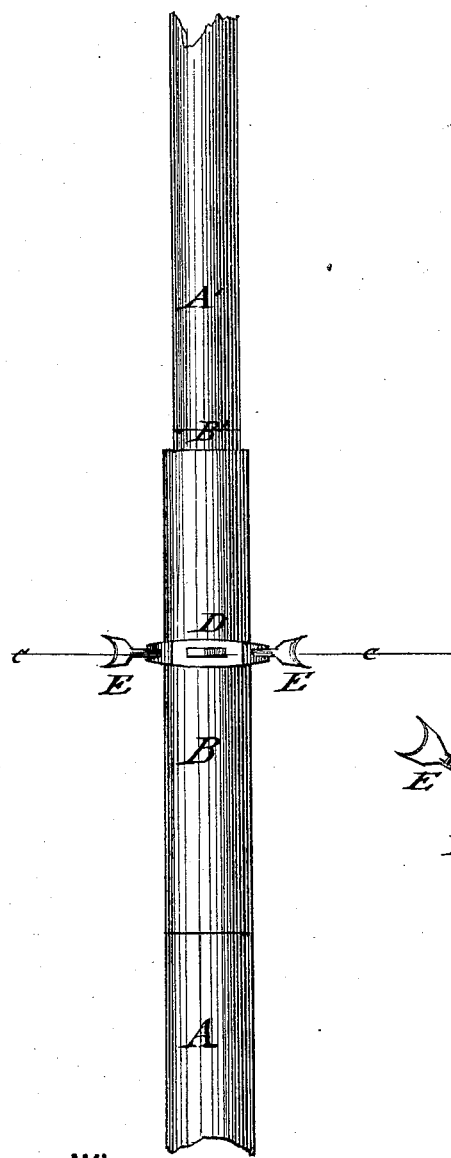
Figure 2:
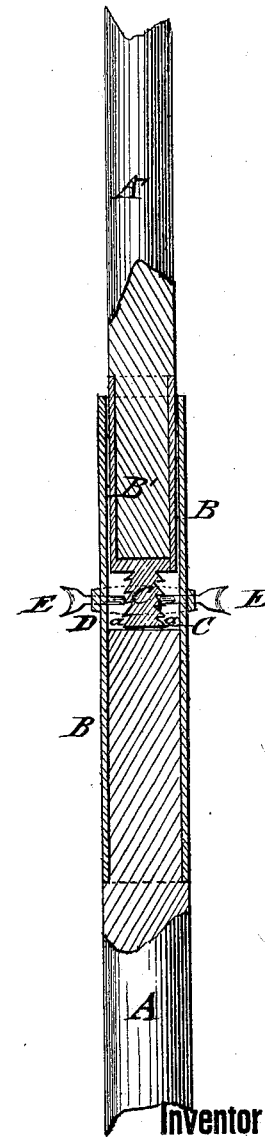
Figure 3:
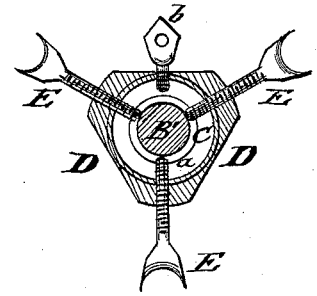

Be it known that I, WILLIAM M. SMITH, of Reading, in the county of Berks and State of Pennsylvania, have invented a new and useful Improvement in Fishing-Rods, of which the following is a specification:

In the accompanying drawing, Figure 1 represents a side elevation of a fishing-rod with my improved ferrule for connecting the parts of the rod. Fig. 2 is a vertical section of the same, and Fig. 3 is a horizontal section through the ferrule on the line $c\ c$, Fig. 1.

Similar letters of reference indicate corresponding parts.

The object of my invention is to furnish to sportsmen a fishing-rod, which, by the connection of its parts by my improved ferrule, overcomes the defective connections of the rods hitherto used, and which combines increased durability and strength with a more ornamental outside appearance. My invention consists of a ferrule-connection of the parts of a fishing-rod, by which the ferrule of the thinner part is provided with a notched cylindrical or smooth conical extension, which is acted upon by set-screws passing through a collet of the inclosing-ferrule of the thicker part, locking the parts rigidly together.

In the drawing, A A' represent two adjacent sections of a fishing-rod, being provided with two cylindrical ferrules, B B', of which the ferrule B', of smaller diameter, fits closely into the wider, B. A cylindrical metallic extension, C, at the lower end of ferrule B', is made with a smaller diameter than the ferrule B' for the lower and thicker parts of the rod, but of the same diameter at the thinner-end parts of the rod to give strength, without too much weight. It is provided with circular grooves or notches $a$, into which the set-screws of the outer ferrule are locked. The outer hollow ferrule B has a projecting collet or ring, D, of circular or polygonal shape, through which, by preference, three set-screws, E, more or less, are arranged, of sufficient length to pass through collet D and ferrule B to engage the grooves $a$ of ferrule B'.

The heads of the set-screws may be made of any desired ornamental shape to give a neat and attractive appearance to the rod.

When the set-screws E are turned in to lock into the grooves $a$ the ferrule B' is connected firmly to the ferrule B, and thereby effectively prevents the separation of the parts of the fishing-rod and the annoyance arising therefrom when following the sport.

The guide ring or staple $b$, screwed into the collet D, serves for passing the fishing-line to the reel.

For disconnecting the parts the set-screws are loosened and the ferrules withdrawn, which is accomplished quickly and without loss of time.

Instead of the cylindrical grooved extension C a plain conical extension of ferrule B may be used, which serves the same purpose, and may be made of the same size at all the ferrules of the rod.

Having thus described my invention, I claim as new and desire to secure by Letters Patent—

1. The combination of the part A of a fishing-rod having ferrule B, collet D, and set-screws E, with the part A' having ferrule B' and extension C, substantially as and for the purpose described.

2. The outer ferrule B, having collet D with set-screws E and staple $b$, as set forth.

3. The inner ferrule B', with grooved, notched, or smooth extension C, substantially as described.

WILLIAM MARX SMITH.

Witnesses:
WM. B. SCHOENER,
J. DALLAS SCHOENER.